Dec. 25, 1962    R. B. RANSOM    3,069,800
SPINNING REEL LINE RELEASE DEVICE
Filed Feb. 6, 1961
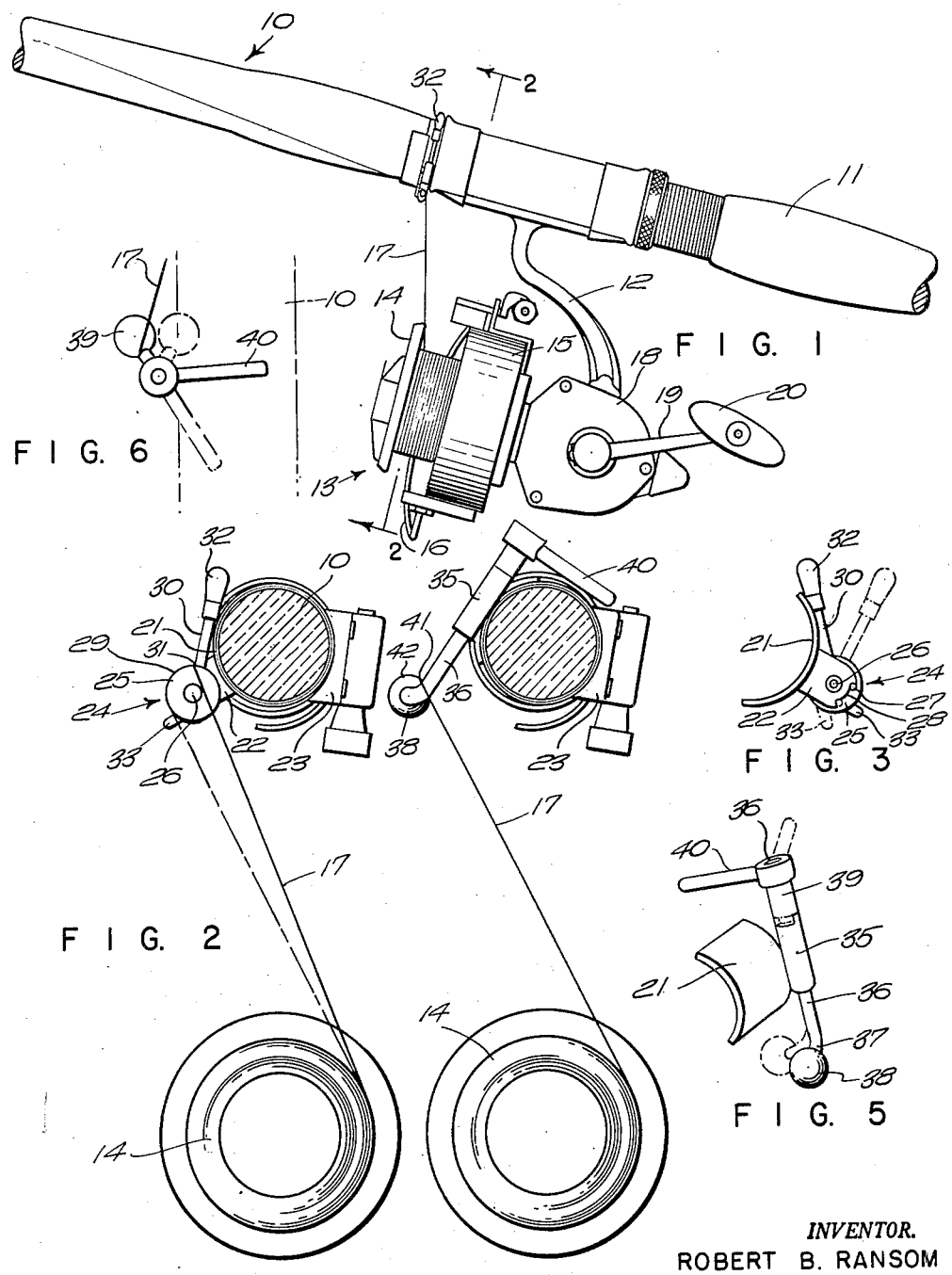
INVENTOR.
ROBERT B. RANSOM
BY
Barlow & Barlow
ATTORNEYS United States Patent Office 3,069,800
Patented Dec. 25, 1962

3,069,800
SPINNING REEL LINE RELEASE DEVICE
Robert B. Ransom, Westerly, R.I.
(N. Williams Road, Weekapaug, R.I.)
Filed Feb. 6, 1961, Ser. No. 87,455
4 Claims. (Cl. 43—25)

This invention relates to a spinning reel line holding and release device of the type particularly designed for use in connection with a fishing rod.

In using a fishing rod which is equipped with a spinning reel, it is usual to control the fishing line as casting occurs by the thumb holding it against the rod or with the finger until such time as it is to be released. This action varies with the weight of the lure, speed with which the lure is thrown, and many other variable factors. Further, in operating a spinning reel line in this manner, it is not infrequent that the skin may be worn off the finger or the finger might get caught in a line loop under certain conditions.

One of the objects of this invention is to provide a device over which the line may be trained and held and which may be released at the time desired by finger manipulation in such a manner that the finger will not be injured in the operation.

Another object of the invention is to provide a device of the above character which may be released independent of the weight of the lure which is being cast or independent of the tension on the line.

Another object of the invention is to provide a device of the above character which may be operated in such a way that contact of the finger with the line for release of the line need not be had.

Another object of the inventioin is to provide a device of the above character in which the line has no relative movement with respect to the guide point over which it extends for preventing release of the line from the reel.

Another object of the invention is to provide a device of the above character where no part has to be accelerated by the pull on the line in order to achieve a release of the line from being held.

Another object of the invention is to provide a device of the above character which is not influenced by changing weights of lines or energy used in the casting of the lure.

Another object of the invention is to provide a device of the above character which may be adjusted as to its sensitivity in release, that is, either hard or hair triggering release as the operator may desire.

Another object of the invention is to provide a device of the above character in which the sensitivity may be changed by changing the aspect of the device with reference to the spinning reel, such as by its position relative to the rod on which it is mounted.

Another object of this invention is to provide a device of the above character which may be made for either right or left-hand rods or right or left-hand spinning reels.

Another object of this invention is to provide a device of the above character in which the line may be easily shifted with respect to its release point or from a condition of stability to one of instability.

Another object of the invention is to provide a device of the above character, the releasing operation of which requires no appreciable increase of pull on the line.

Another object of the invention is to provide a device of the above character which may be easily operated by the thumb or finger of the operator.

With these and other objects in view, the invention consists of certain novel features of construction as will be more fully described and particularly pointed out in the appended claims.

In the accompanying drawings:

FIGURE 1 is an elevational view of a portion of a fishing rod with a spinning reel mounted thereon and illustrating the line as leading over a release device which is the subject of this invention;

FIGURE 2 is a section on substantially line 2—2 of FIGURE 1, illustrating the release device as controlling the fishing line to prevent its feeding from the reel while under tension;

FIGURE 3 is a view of the release device separate from the rod and looking at the other side of the device from that shown in FIGURE 2;

FIGURE 4 is a view similar to FIGURE 2 showing a modified form of release device;

FIGURE 5 is a perspective view of the release device of FIGURE 4 alone looking from the other side of the device from that shown in FIGURE 4 and illustrating in dotted lines the release position of the device; and FIGURE 6 is a top plan view of the device shown in FIGURE 5 with it shown in its relative position to the fishing line and to the rod shown in dot-dash lines and also illustrating the relative release position in broken lines.

In proceeding with this invention, I have provided a release device over which the line may be trained so as to dispose the line close to the rod adjacent the reel and at such an angle as to prevent the line from being drawn from the reel, an angle from the reel to a guide eye nearer the end of the rod being necessary for drawing the line from the reel. The position of the device is somewhat the position which the line would assume if operated by the thumb holding the line against the rod ready for the time of release or manually dropping the line for unreeling, the device used taking the place of the thumb or finger of the operator and being in generally the location that the finger would control the line if the device were not present. The device is of a type which may be operated in several ways. For example, the finger might engage the line to throw it off the device if the device did not move. However, a lever or some mechanical means for throwing the line from position is thought preferable, although this is not necessary. Also the device may be used in a manner such that the line tends to turn a part of the device to release position, there being some handle to be engaged by the thumb or finger to prevent this automatic release of the line until the finger releases it, thus requiring the finger to hold the handle in desired position.

With reference to the drawings 10 designates generally the fishing rod having a butt end or handle 11 and being provided with a bracket 12 and spinning reel designated 13 and comprising a spool 14 and cup 15 with bail 16 for rotating the line 17 about the spool to wind it thereon, this bail being operated by means of a gear device in casing 18 with crank 19 and handle 20.

The device which I utilize in connection with this equipment is shown by itself in FIGURE 3 as comprising a saddle 21 from which there extends an ear 22 which may be conveniently formed by bending up a piece of sheet stock from the saddle 21. The curvature of this saddle 21 will be made such as to substantially fit the curvature of the rod 10 or bendable to such form and may be secured thereon by tape or by a clamp means 23 which may be slid along the line to bind the saddle in position. This position of the device may be varied with reference to the reel to adjust the aspect of the device for hard or hair triggering action as desired. A member designated generally 24 and comprising essentially a disc 25 pivoted by pin 26 to the ear 22 is limited in its movement about its pivot 26 by means of a pin 27 extending from the side toward the ear and located in a notch 28 in the ear so as to limit the rotary movement of the disc to the extent of the arc of the slot 28 as illustrated by broken lines in FIGURE 3. This disc provides a hump or raised portion as at 29 as seen in the aspect of FIGURE 2 so that the line 17 in leading from the spool 14 when at one side of the hump 29 will be such that the line will be disposed in a position to prevent unreeling of the line from the spool 14. However, if this line were slid over the hump outwardly from the rod 10, as seen in FIGURE 2, the line would then be free to slide off the disc and assume a path from the spool 14 to an eye nearer the end of the rod which is readily understood, although not shown herein, to provide a path for the line to unreel freely from the spool 14. A projection 30 providing a lever extends from this disc 25 which forms a crotch at 31 into which the line may rest when on the side of the hump 29 nearest the rod. Tension on the line in this position urges the lever against the rod. A handle 32 is provided on this lever for releasing purposes as will be described.

A pin or projection 33 extends from the disc 25 providing an alternate crotch over which the line may extend in which position there will be a tendency for tension on the line to rotate the disc counterclockwise as shown in FIGURE 2 to dispose the projection 33 into the broken line position, as shown in FIGURE 3, to discharge the line therefrom. In this instance it is necessary to hold the lever 30 by the finger if discharge of the line 17 is to be prevented.

In the use of the line as shown in FIGURES 1, 2 and 3 where it is desired that there be a manual action for releasing the line, the line is disposed as shown in full lines and being in the crotch 31 will stay there without it being necessary to touch the lever or its handle 32. However, at the time when the release is desired, the thumb or finger of the operator being adjacent to this position will flick the handle 32 or lever 30 away from the rod which will cause the line to discharge from the device. In the alternate use, the line may be trained over the projection 33, and in this instance the lever will then have to be held by the finger to prevent rotation of the disc to a release position and a discharge of the line. When release is desired, the finger disengages the lever and tension on the line moves the disc to release the line. Either form may be used as the operator may desire.

In the form of the invention shown in FIGURES 4, 5 and 6 the saddle 21, which is the same as heretofore described, will have a tube bearing 35 secured to one edge thereof, and in this tube bearing there will be pivoted a member 36 in the form of a shaft having an offset arm 37 with a ball 38 at the end thereof, while on the other side of the tube bearing 35 the shaft will have a sleeve 39 frictionally held on the shaft 36 and which will have at its upper end a projection 40 in the form of a lever extending radially therefrom. This saddle 21 will be mounted on the rod 10 so that the shaft 36 will be disposed downwardly somewhat therefrom, such as shown in FIGURE 4, so that in the aspect therein shown the line 17 will lead over the shaft 36 and over a hump formed by ball 38 in a sort of crotch 41. In this case there will be a tendency for the line to rotate the shaft 36 as seen in FIGURE 6 in the sleeve as tension on the line 17 exists, and it will be necessary to apply the finger to the lever 40 to prevent this rotation until the proper time. However, when it is desired that the line be released, it is merely necessary to release holding on the lever 40 when the shaft 36 will then under tension of the line rotate in its bearing 35 from the position shown in full lines in FIGURES 5 and 6 to the position shown in broken lines in these figures, thus placing the ball in such aspect to the reel that the line 17 will slip from its crotch 41 over the ball and release from the device. In order to provide a certain sensitivity to the device, it will be positioned rotatively about the rod 10 in such a relationship that the hump 29 or corresponding hump 42 of FIGURE 4 will bear to the point of release so that it may be easily discharged from position should a very sensitive discharge be desired.

This device may be made for use with right or left-hand reels as used on rods by right or left-handed individuals.

I claim:

1. In combination with a fishing rod having a spinning reel mounted thereon adjacent the butt end, a line on said reel and a guide eye forward of the reel toward the tip of the rod through which the line extends from the reel at such angle as to feed over the end of the reel, a device mounted on the rod at a location such that when the line is trained thereover, it is diverted sufficiently from a straight path between the reel and the guide eye to prevent feeding of the line from the reel, said device comprising a shaft journally mounted on an axis at right angles to the axis of the rod, said shaft having on one side of said journal mounting a hump extending laterally of the axis of the shaft to extend laterally of the lead of the line and on one side of which the line is stable under tension and will remain trained over the device, and a lever on the other side of said journal mounting extending laterally of the axis of the shaft for manual engagement to control the rotation of the shaft for discharge of the line.

2. The combination of claim 1 wherein there are means to adjust the relative angular position of said lever and hump about said shaft to control the sensitivity of the device.

3. The combination of claim 1 wherein said hump presents an arcuate surface for engagement of the line.

4. In combination with a fishing rod having a spinning reel mounted thereon adjacent the butt end, a line on said reel and a guide eye forward of the reel toward the tip of the rod through which the line extends from the reel at such angle as to feed over the end of the reel, a device mounted on the rod at a location such that when the line is trained thereover, it is diverted sufficiently from a straight path between the reel and the guide eye to prevent feeding of the line from the reel, said device comprising a pivotally mounted member presenting a non-resilient hump extending laterally of the lead of the line and on one side of which the line is stable under tension and will remain trained over the device and on the other side of which the line will discharge from the device, the opposite sides of the hump being connected by a continuous smooth curved surface extending laterally of the lead of the line and over which the line under tension may move laterally, said member having a projection on the discharge side of the hump extending away from its pivot point to provide a crotch for limiting the lateral movement of the line, said crotch being so located that tension on the line when engaging said crotch tends to swing the member about its pivot for discharge of the line and a lever on said member for manual engagement to retardingly control the pivoting of the member.

References Cited in the file of this patent

UNITED STATES PATENTS

| | | |
|---|---|---|
| 399,588 | Washburn | Mar. 12, 1889 |
| 863,606 | Hoerle | Aug. 20, 1907 |
| 1,964,631 | Hansen | June 26, 1934 |
| 2,648,505 | Mauborgne | Aug. 11, 1953 |
| 2,761,237 | Piaja | Sept. 4, 1956 |
| 2,810,982 | Bucciarelli | Oct. 29, 1957 |
| 2,843,963 | Butehorn | July 22, 1958 |
| 2,846,804 | Elliott | Aug. 12, 1958 |
| 2,963,238 | Gaire | Dec. 6, 1960 |

FOREIGN PATENTS

| | | |
|---|---|---|
| 1,116,675 | France | Feb. 6, 1956 |
| 1,176,849 | France | Nov. 24, 1958 |
| 781,302 | Great Britain | Aug. 14, 1957 |